United States Patent
Sawyers-Abbott et al.

(10) Patent No.: US 10,066,510 B2
(45) Date of Patent: Sep. 4, 2018

(54) NACELLE MOUNTED LATCHING SYSTEM

(71) Applicant: United Technologies Corporation, Hartford, CT (US)

(72) Inventors: Nigel David Sawyers-Abbott, South Glastonbury, CT (US); Joseph P. Foster, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 240 days.

(21) Appl. No.: 14/769,915

(22) PCT Filed: Mar. 13, 2014

(86) PCT No.: PCT/US2014/025335
§ 371 (c)(1),
(2) Date: Nov. 24, 2015

(87) PCT Pub. No.: WO2014/151275
PCT Pub. Date: Sep. 25, 2014

(65) Prior Publication Data
US 2016/0084113 A1    Mar. 24, 2016

Related U.S. Application Data

(60) Provisional application No. 61/788,338, filed on Mar. 15, 2013.

(51) Int. Cl.
*F01D 25/26* (2006.01)
*B64D 29/06* (2006.01)
(Continued)

(52) U.S. Cl.
CPC ........... *F01D 25/265* (2013.01); *B64D 29/06* (2013.01); *F01D 21/00* (2013.01); *F02C 7/20* (2013.01);
(Continued)

(58) Field of Classification Search
CPC ....... F01D 25/265; F01D 21/00; B64D 29/06; B64D 29/00; B64D 29/08; F02C 7/20;
(Continued)

(56) References Cited

U.S. PATENT DOCUMENTS 4,549,708 A    10/1985  Norris
4,679,750 A *  7/1987  Burhans .................. B64D 29/06
                                                              244/129.4
(Continued)

FOREIGN PATENT DOCUMENTS

EP    0393259 A1    10/1990
EP    0779429 A2     6/1997
(Continued)

OTHER PUBLICATIONS

The International Search Report dated Jun. 27, 2014 for International Application No. PCT/US2014/025335.
(Continued)

*Primary Examiner* — Laert Dounis
*Assistant Examiner* — Kelsey Stanek
(74) *Attorney, Agent, or Firm* — Kinney & Lange, P.A.

(57) ABSTRACT

A nacelle for a gas turbine engine includes a upper and lower bifurcations, an inner diameter cowl and a first latch system. The inner diameter cowl extends between the upper and lower bifurcations and the first latch system is mounted on the inner diameter cowl. The first latch system is spaced along the inner diameter cowl between the upper and lower bifurcations.

15 Claims, 4 Drawing Sheets

(51) Int. Cl.
*F01D 21/00* (2006.01)
*F02C 7/20* (2006.01)
*F02K 1/32* (2006.01)

(52) U.S. Cl.
CPC ............ *F02K 1/32* (2013.01); *F05D 2220/32* (2013.01); *F05D 2260/30* (2013.01)

(58) Field of Classification Search
CPC ..... F02K 1/32; F02K 1/06; F02K 1/52; F05D 2220/32; F05D 2220/36; F05D 2260/30; B64C 7/00; B64C 7/02
USPC ...................................... 415/126, 144, 214.1
See application file for complete search history.

(56) References Cited

U.S. PATENT DOCUMENTS

| | | | |
|---|---|---|---|
| 4,858,970 A | 8/1989 | Tedesco et al. |
| 5,035,379 A | 7/1991 | Hersen et al. |
| 5,076,514 A | 12/1991 | Melcher |
| 5,350,136 A | 9/1994 | Prosser et al. |
| 5,592,813 A | 1/1997 | Webb |
| 5,823,468 A | 10/1998 | Bothe |
| 5,915,765 A | 6/1999 | Sternberger |
| 6,032,901 A | 3/2000 | Carimali et al. |
| 6,189,832 B1 | 2/2001 | Jackson |
| 6,343,815 B1 | 2/2002 | Poe |
| 6,629,712 B2 | 10/2003 | Jackson et al. |
| 6,877,321 B2 | 4/2005 | Retzlaff et al. |
| 7,040,578 B2 | 5/2006 | Halin |
| 7,275,362 B2 | 10/2007 | Strunk et al. |
| 7,559,507 B2 | 7/2009 | Harrison et al. |
| 7,571,527 B2 | 8/2009 | Burnett et al. |
| 7,600,371 B2 | 10/2009 | Sternberger |
| 7,690,190 B2 | 4/2010 | Thornock et al. |
| 7,963,039 B2 | 6/2011 | Burnett et al. |
| 8,205,820 B2 | 6/2012 | Goossen et al. |
| 2006/0038065 A1 | 2/2006 | Howe et al. |
| 2007/0084964 A1 | 4/2007 | Sternberger |
| 2010/0115958 A1* | 5/2010 | Parham ..................... F02K 1/09 60/771 |
| 2011/0113837 A1* | 5/2011 | Soulier .................. B64D 29/06 70/237 |
| 2011/0114796 A1 | 5/2011 | Porte et al. |
| 2012/0280081 A1 | 11/2012 | Calder et al. |
| 2013/0259641 A1* | 10/2013 | Stewart ................... F01D 25/24 415/1 |

FOREIGN PATENT DOCUMENTS

| | | |
|---|---|---|
| EP | 0845581 A1 | 6/1998 |
| EP | 1764499 A1 | 3/2007 |
| EP | 1998012 A2 | 12/2008 |
| JP | 2013501184 A | 1/2013 |
| WO | 1994026591 A1 | 11/1994 |
| WO | 1998023852 A1 | 6/1998 |
| WO | 1999051490 A1 | 10/1999 |
| WO | 2008096154 A1 | 8/2008 |
| WO | 2009024477 A1 | 2/2009 |
| WO | 2009043635 A1 | 4/2009 |
| WO | 2010007311 A1 | 1/2010 |
| WO | 2010007313 A1 | 1/2010 |
| WO | 2012037988 A1 | 3/2012 |
| WO | 2012134848 A2 | 10/2012 |
| WO | WO2013184330 A1 | 12/2013 |

OTHER PUBLICATIONS

Extended European Search Reported for EP Application No. 14769280.0 dated Oct. 21, 2016 10 pages.

* cited by examiner

NACELLE MOUNTED LATCHING SYSTEM

CROSS-REFERENCE TO RELATED APPLICATION(S)

This application claims the benefit of PCT application PCT/US2014/025335, filed Mar. 13, 2014, for "Nacelle Mounted Latching System" by Nigel David Sawyers-Abbott and Joseph P. Foster, and U.S. Provisional Application No. 61/788,338, filed Mar. 15, 2013, for "Nacelle Mounted Latching System" by Nigel David Sawyers-Abbott and Joseph P. Foster.

BACKGROUND

This disclosure relates to gas turbine engines, and in particular, to a system for latching a gas turbine engine nacelle.

Gas turbine engines typically include a nacelle surrounding an engine core. Portions of the nacelle can use a latch system to couple portions of the nacelle to one another and to latch to the engine core itself. These latches keep the nacelle and engine from separating due to load events such as a burst Environmental Control System (ECS) duct. The latch system needs to be released to open the nacelle for on-the-ground maintenance of the engine core.

To facilitate on-the-ground maintenance, nacelles are typically divided along split-lines into two cowl halves called doors. Current latch systems typically latch together the two cowl halves along a bifurcation with a split-line at the bottom dead center of the gas turbine engine. Although effective, the envelope in this area is limited due to mechanical, electrical, and other systems. Thus, it can be difficult with current latch systems to run cables and position latches along the bifurcation. Additionally, with the advent of gas turbine engines that employ a lower fan pressure ratio during operation, it is desired to have latch systems resist load events such as a burst Environmental Control System (ECS) duct.

SUMMARY

A nacelle for a gas turbine engine includes upper and lower bifurcations, an outer diameter cowl, an inner diameter cowl and a first latch system. The outer and inner diameter cowl extends from the upper bifurcation to the lower bifurcation and the first latch system is mounted on the inner diameter cowl. The first latch system is spaced along the inner diameter cowl between the upper and lower bifurcations.

A nacelle for a gas turbine engine includes a first door, a first latch system, a second door, and a second latch system. The first door has a first inner diameter cowl connected between the upper and lower bifurcations. The first latch system is mounted on the first inner diameter cowl and is spaced along the first inner diameter cowl between the upper and lower bifurcations. The second door has a second inner diameter cowl connected to a second half of the upper and lower bifurcations. The second latch system is mounted on the second inner diameter cowl and is spaced along the second inner diameter cowl between the upper and lower bifurcations.

A gas turbine engine includes a case and a nacelle. The nacelle is latched to the case and includes upper and lower bifurcations, an inner diameter cowl and a first latch system. The inner diameter cowl extends from the upper bifurcation to the lower bifurcation and the first latch system is mounted on the inner diameter cowl. The first latch system is spaced along the inner diameter cowl from the between the upper and lower bifurcations.

DETAILED DESCRIPTION

Figure 1:
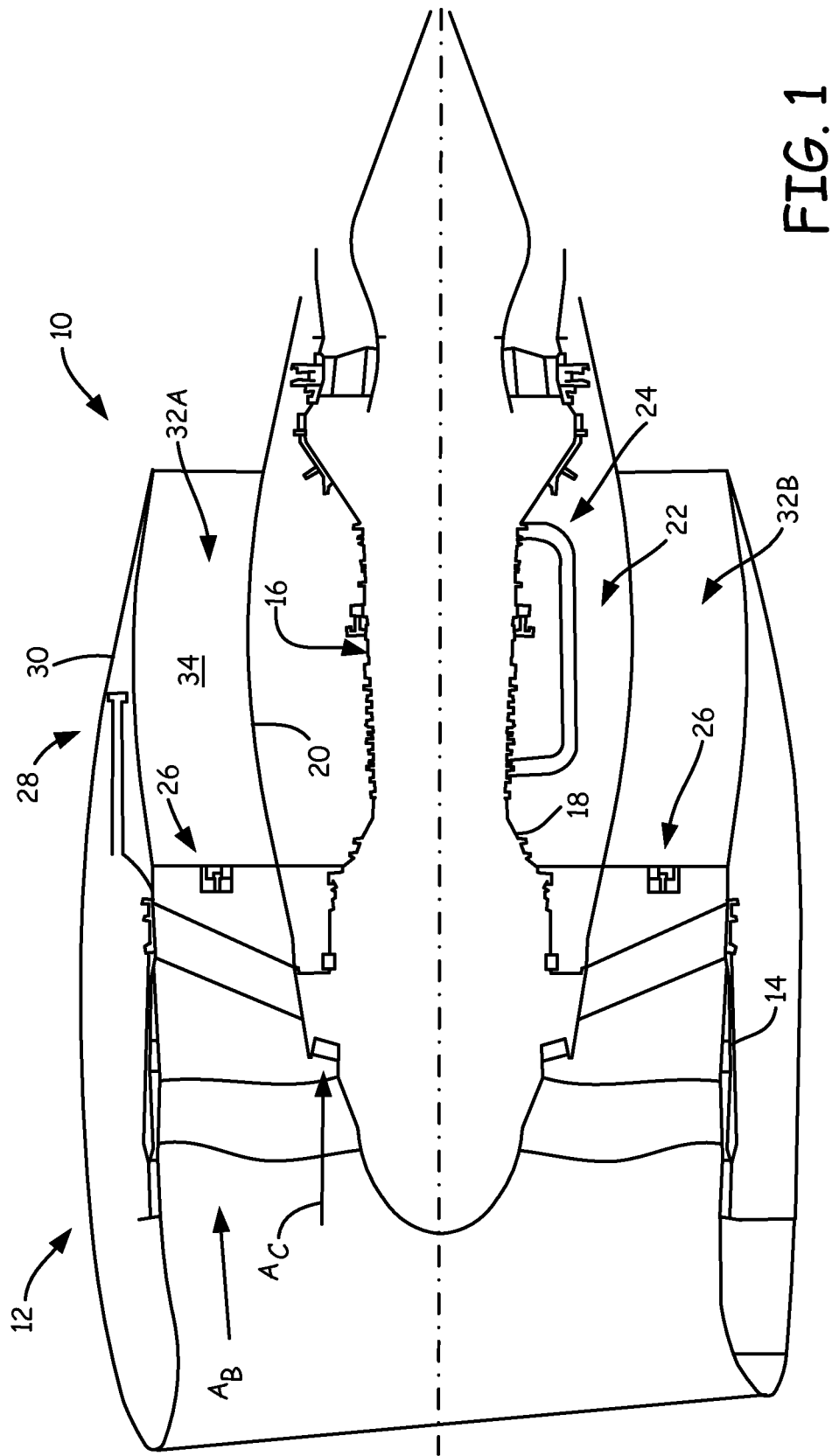
FIG. 1 is a cross section of a schematic gas turbine engine showing one embodiment of a latching system connecting a nacelle to a fan case.

FIG. 1 illustrates one embodiment of gas turbine engine 10. Gas turbine engine 10 includes nacelle 12, fan case 14, core 16, intermediate case 18, fan duct inner fixed structure 20, core compartment 22, compressed air duct 24, and latching system 26. Nacelle 20 includes thrust reverser 28 with translating sleeve 30 and upper and lower bifurcations 32A and 32B.

The construction and operational characteristics of gas turbine engine 10 are known, and therefore, will not be described in great detail. In the embodiment shown in the FIGURES, gas turbine engine 10 is a high bypass ratio turbofan gas turbine engine but the invention is applicable to other types of gas turbine engines. As used herein, terms such as "front", "forward", "aft", "rear", "rearward" should be understood as positional terms in reference to the direction of airflow $A_C$ and $A_B$ through gas turbine engine 10.

Nacelle 12 encloses fan case 14, which is disposed adjacent to core 16. Core 16 is a static structure generally comprised of several sub-structures and is often referred to as the engine backbone. One of such sub-structures is intermediate case 18, which encloses portions of compressor section of gas turbine engine 10 aft of fan case 14.

Inner fixed structure 20 of fan duct 34 surrounds the core 16 and provides for core compartment 22. Various components may be provided in the core compartment 22, such as fluid conduits, or compressed air duct 24. Compressed air duct 24 is under high pressure and may supply compressed air from low or high pressure compressor stage to higher pressure turbine stage for cooling. Compressed air from core 16 can additionally be used in an ECS of an aircraft.

Only a portion of latching system 26 is shown in the cross-section of FIG. 1, and connects door 36A and door 36B to engine core 16. In particular, latching system 26 is positioned forward of or at intermediate case 18. Positioning latching system 26 at the forward end of the doors 36A and 36B allows latch system 26 to better resist the consequences of load events such as a burst ECS duct, because the latches of latch system are disposed closer to core 16.

Nacelle 12 portion aft of fan exit guide vanes includes thrust reverser 28, fan duct inner fixed structure 20, and upper and lower bifurcations 32A, 32B, collectively the structures form portions of fan duct 34. In the embodiment of FIG. 1, thrust reverser 28 is positioned along an outer diameter of nacelle 12 at an aft end thereof. Thrust reverser 28 includes translating sleeve 30. Translating sleeve 30 is shown in a closed position in FIG. 1.

Upper and lower bifurcations 32A and 32B extend generally radially in bypass flowpath of fan duct 34 between outer diameter of nacelle 12 and duct inner fixed structure 20. Upper and lower bifurcations 32A and 32B may be disposed in locations opposite one another relative to core 16. Upper and lower bifurcations 32A and 32B accommodate wires, fluid conduits, engine mounting, or other components.

During operation, airflow is drawn into gas turbine engine 10 at the fan section. A portion of the airflow, comprising airflow $A_B$, bypasses core 16 and passes through nacelle 12 along fan duct 34 and produces forward thrust. A second portion of the airflow, comprising airflow $A_C$ enters and is pressurized in the compressor sections (low and high). Fuel is mixed with the pressurized air and combusted within a combustor. The combustion gases are discharged through the turbine sections (high and low), which extract energy therefrom for powering the compressor sections and the fan section.

Figure 2:
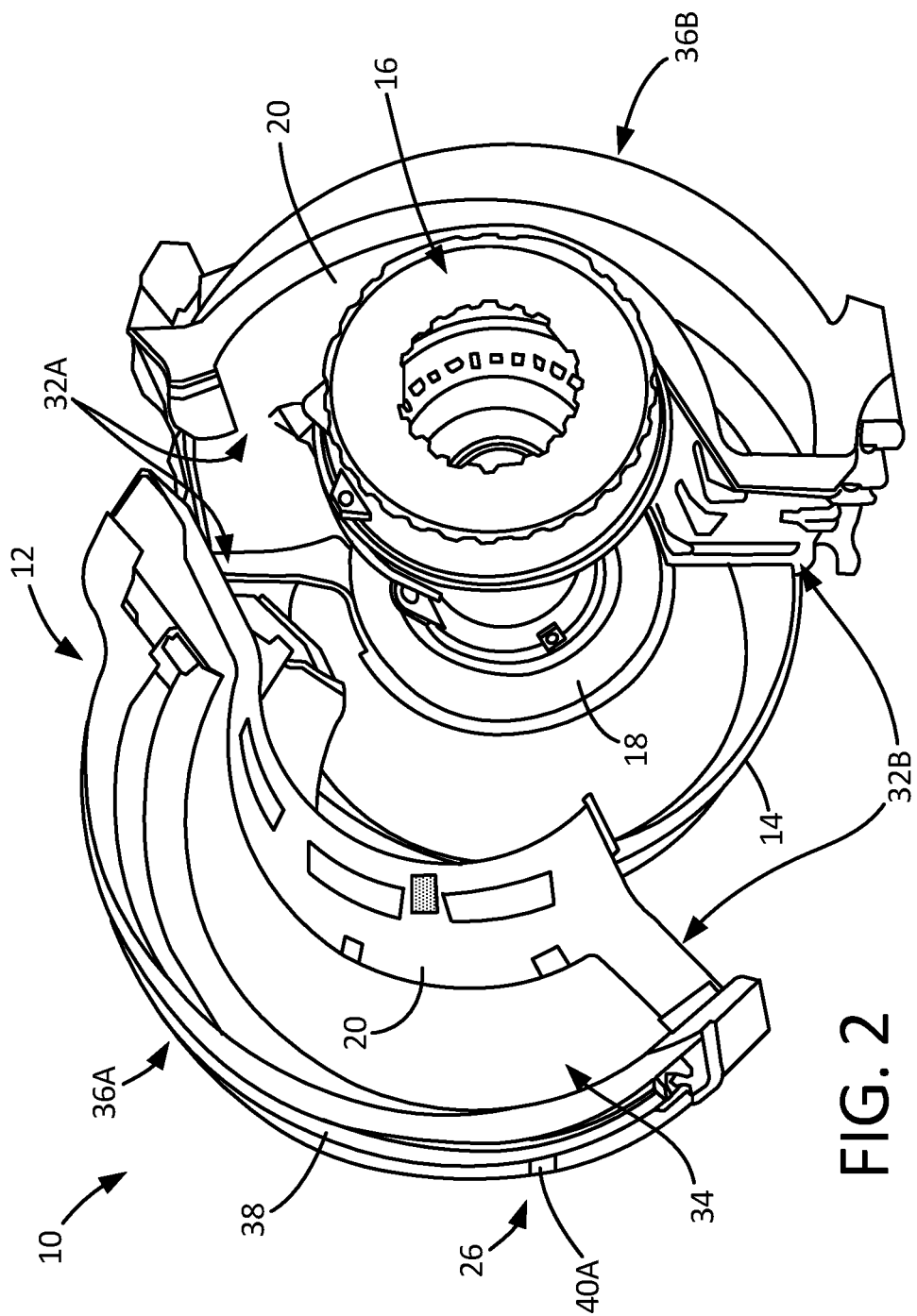
FIG. 2 is a perspective view of the nacelle with a door of the nacelle raised.

FIG. 2 shows a semi-exploded perspective view of gas turbine engine 10 including nacelle 12, fan case 14, core 16, intermediate case 18, inner fixed structure 20, latching system 26, upper and lower bifurcations 32A and 32B, and fan duct 34. Nacelle 12 includes doors 36A and 36B each with outer diameter cowl 38.

Nacelle 12 is split along fan duct inner fixed structure 20, upper and lower bifurcations 32A and 32B, and outer diameter cowl 36 into doors 36A and 36B. Doors 36A and 36B pivot on hinges (not shown) to open and expose core 16 and other components of gas turbine engine 10 for assembly, maintenance or engine removal and replacement. Doors 36A and 36B are fastened or otherwise connected to pylon superstructure (not shown).

FIG. 2 shows door 36A drawn back away from core 16. Intermediate case 18 is disposed at a forward portion of core 16 adjacent fan case 14. Doors 36A and 36B are disposed to either side of core 24. In particular, inner fixed structure 20 of doors 36A and 36B surrounds core 16. As discussed previously, inner fixed structure 20 forms an inner diameter flow path of fan duct 34. Similarly, outer diameter cowl 38 forms an outer diameter flow path of fan duct 34. Inner fixed structure 20 is connected to outer diameter cowl 38 by upper and lower bifurcations 32A and 32B.

Handle 40A of latching system 26 is disposed within inner diameter cowl 20 near an aft end thereof. In particular, a portion of handle 40A is exposed along an outer surface of inner diameter cowl 20. The remainder of handle 40A and other components of latching system 26 are disposed within and extend forward through inner diameter cowl 20 toward intermediate case 18.

As shown in FIG. 2, handle 40A is disposed circumferentially about nacelle 12 a distance away from upper and lower bifurcations 32A and 32B and split-line between doors 36A and 36B. Such a configuration avoids having to position handle 40A adjacent to or across the split-line, and additionally avoids having to run parts of latching system 26 through the tight envelope of lower bifurcation 32B. Thus, disposing handle 40A at a distance from lower bifurcation 32B frees up space within lower bifurcation 32B for components such as wires and fluid conduits and a more aerodynamically efficient lower bifurcation 32B design.

Figure 3A:
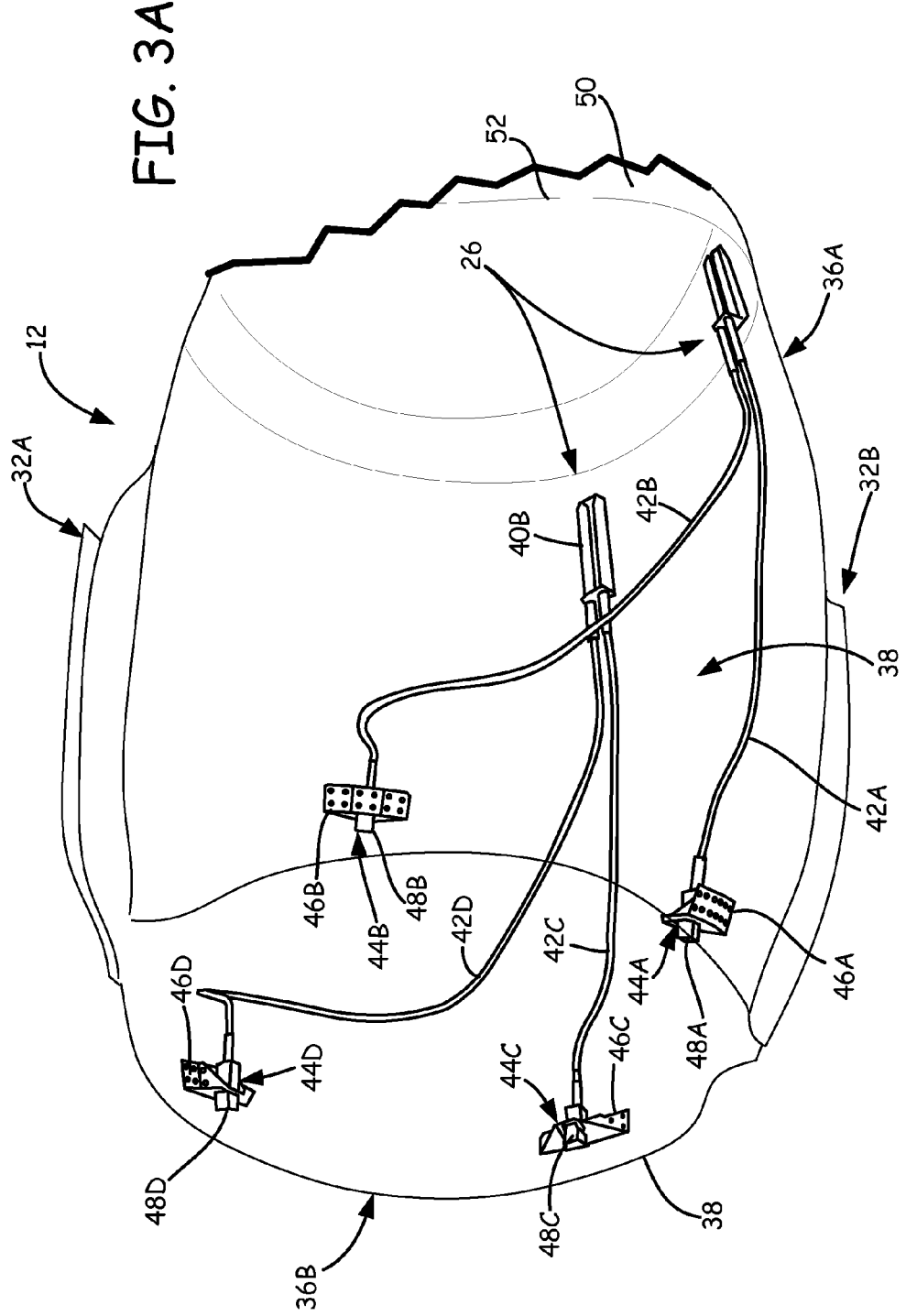
FIG. 3A is a perspective view of the nacelle employing the latching system of FIG. 1.
Figure 3B:
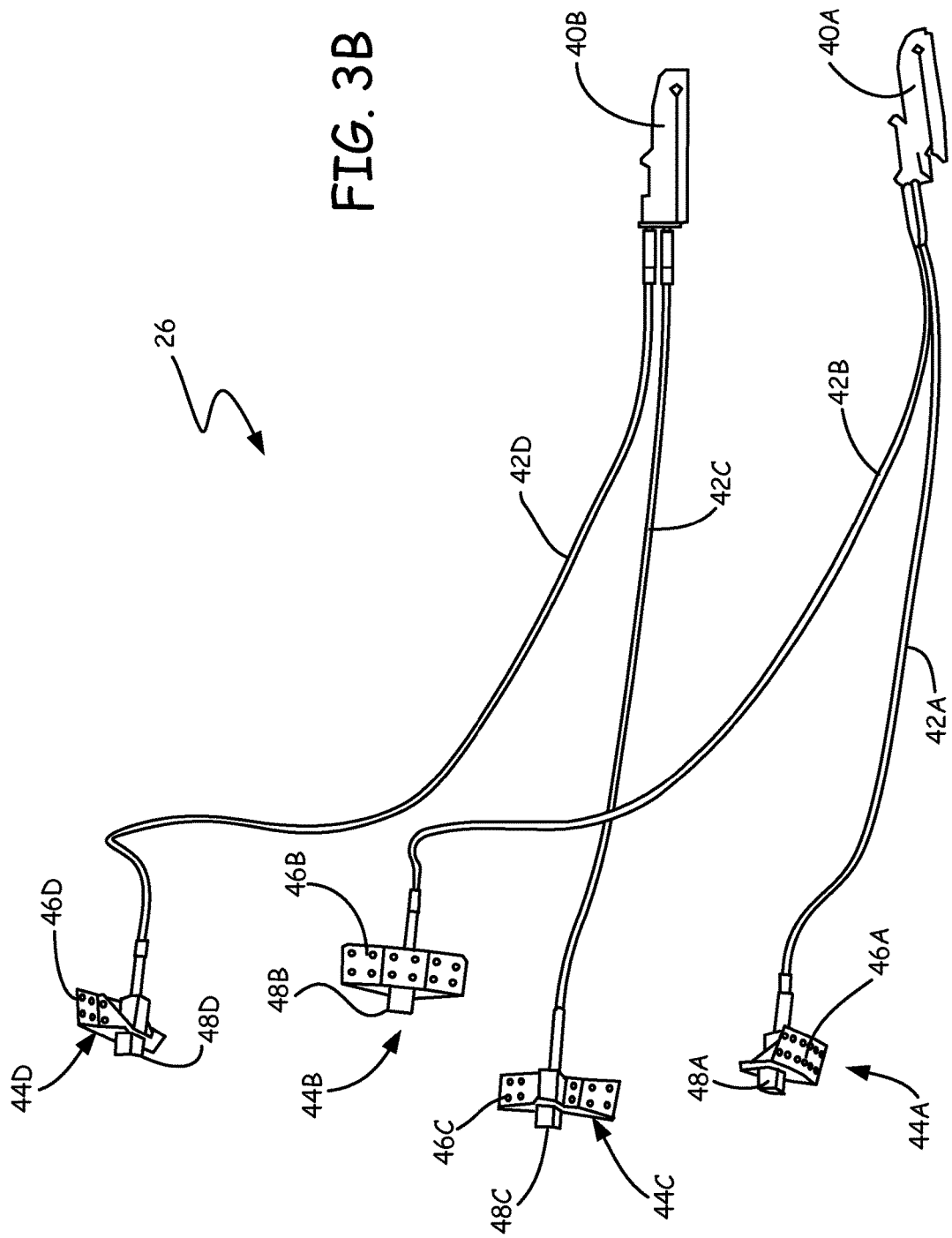
FIG. 3B is a perspective view of the latching system of FIG. 3A in isolation including handles, cables, and latching mechanisms.

FIG. 3A shows a perspective view of nacelle 12 with various components removed to illustrate one embodiment of latching system 26. FIG. 3B shows components of latching system 26 in isolation. In FIG. 3A, components of doors 36A and 36B including inner fixed structure 20A and 20B and outer diameter flow surface of fan duct 34 (FIGS. 1 and 2) are removed to illustrate latching system 26, which includes handles 40A and 40B, linking members 42A, 42B, 42C, and 42D, and latching mechanisms 44A, 44B, 44C, and 44D. Latching mechanisms 44A, 44B, 44C, and 44D include brackets 46A, 46B, 46C, and 46D and pin latches 48A, 48B, 48C, and 48D.

As shown in FIG. 3A, handles 40A and 40B are disposed within outer diameter cowl 20 of each door 36A and 36B, respectively. In particular, handles 40A and 40B are disposed adjacent an aft end of nacelle 12 in an area typically called aft core cowl 50. Thus, in the embodiment shown in FIG. 3A, handles 40A and 40B are mounted on aft core cowl 50 adjacent aft split-line 52.

Handle 40A is connected to linking members 42A, 42B. Handle 40B is connected to linking members 42C, 42D. Linking members 42A, 42B, 42C, and 42D extend forward from handles 40A and 40B internally through outer diameter cowl 20 to latching mechanisms 44A, 44B, 44C, and 44D. Latching mechanisms 44A, 44B, 44C, and 44D are adapted to interface with engine frame 18 (FIG. 1) and connect fan ducts 36A and 36B to engine case 16. Brackets 46A, 46B, 46C, and 46D are affixed to inner diameter cowl 20. Pin latches 48A, 48B, 48C, and 48D are mounted within brackets 46A, 46B, 46C, and 46D, respectively, and can be actuated to engage with and disengage from lugs or similar mounting structure of engine frame 18.

In FIG. 3A, a portion of handle 40A is pivotal to protrude from door 36A and a portion of handle 40B is pivotal to protrude from door 36B. Handles 40A and 40B are designed to open forward (into the direction of airflow $A_B$ across nacelle 12 during operation). In the embodiment of FIGS. 3A and 3B, linking members 42A, 42B, 42C, and 42D comprise push-pull cables surrounded by sheaths. Thus, handles 40A and 40B act as a lever and fulcrum to push and pull cables to actuate (insert or retract) pins of pin latches 48A, 48B, 48C, and 48D as desired. Systems utilizing cables are described in further detail in U.S. Pat. Nos. 5,350,136 and 4,549,708, which are incorporated herein by reference. In other embodiments, the cables described can be substituted for rods, hydraulic, electronic, or other linkage components. Similarly, other mechanisms for connecting nacelle to engine case 18 can be utilized in addition to or in alternative to pin latches 48A, 48B, 48C, and 48D. For example, hooks or other known methods of connection can be used in other embodiments. FIGS. 3A and 3B provide only one exemplary embodiment, thus the number of handles 40A and 40B, linking members 42A, 42B, 42C, and 42D, and latching mechanisms 44A, 44B, 44C, and 44D can change from embodiment to embodiment. In another embodiment the latch mechanisms may be utilized to attach door 36A to door 36B via mechanism located in the upper and lower bifurcations 32A and 32B instead of to the engine frame 18.

As shown in FIG. 3A, handles 40A and 40B and linking members 42A, 42B, 42C, and 42D are circumferentially spaced from upper and lower bifurcations 32A and 32B. Such a configuration avoids having to position handle 40A adjacent to or across the split-line, and additionally avoids having to run parts of latching system 26 through the tight envelope of lower bifurcation 32B. Thus, disposing handle 40A at a distance from lower bifurcation 32B frees up space within lower bifurcation 32B for components such as wires and fluid conduits and allow for improved aerodynamic design of the lower bifurcations. Positioning latching mechanisms 44A, 44B, 44C, and 44D at intermediate case 18 allows latch system 26 to better resist load events such as a burst ECS duct, because the latches of latch system are disposed closer to core 16. Additionally, positioning handles 40A and 40B on each door 36A and 36B allows doors 36A and 36B to be opened or latched independently of one another. Thus, only one door may be opened for assembly, maintenance or engine removal and replacement as desired.

The references to upper bifurcation and lower bifurcation in the above description are in particular reference to an under wing mounted propulsion system. However, it should be recognized that the terms upper and lower merely relate to the reference of a plane of reference relative to a pylon system and would equally apply in other engine mount configurations. It should also be recognized that the configuration would be applicable to other nacelle configurations that may or may not include a lower bifurcation structure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A nacelle for a gas turbine engine includes a bifurcation, an outer diameter cowl, and inner diameter cowl and a first latch system. The outer and inner diameter cowl extend from the upper bifurcation to the lower bifurcation and the first latch system is mounted on the inner diameter cowl. The first latch system is spaced along the inner diameter cowl from the upper and lower bifurcations.

The nacelle of the preceding paragraph can optionally include, additionally and/or alternatively, any one or more of the following features, configurations and/or additional components:
   a second latch system, wherein the inner diameter cowl is separated into first and second halves, and the first latch system is mounted on the first half and the second latch system is mounted to the second half;
   the bifurcation comprises a lower bifurcation;
   the first latch system includes a handle mounted within and pivotal to protrude from the inner diameter cowl, one or more linking members extending through the inner diameter cowl from the handle, and one or more latching mechanisms disposed toward a forward end of the inner diameter cowl and connected to the one or more linking members;
   the inner diameter cowl includes an aft core cowl and the handle is mounted on the aft core cowl;
   the handle opens in a forward direction relative to the inner diameter cowl;
   the handle is mounted to a thrust reverser of the outer diameter cowl;
   the latching mechanism comprise pin latches that engage the engine case; and
   the one or more linking members comprise push-pull cables.

A nacelle for a gas turbine engine includes a first door, a first latch system, a second door, and a second latch system. The first door has a first inner diameter cowl connected between a first half of the upper and lower bifurcations. The first latch system is mounted on the first inner diameter cowl and is spaced along the first inner diameter cowl from the upper and lower bifurcations. The second door has a second inner diameter cowl connected between a second half of the upper and lower bifurcations. The second latch system is mounted on the second inner diameter cowl and is spaced along the second inner diameter cowl from the upper and lower bifurcation.

The nacelle of the preceding paragraph can optionally include, additionally and/or alternatively, any one or more of the following features, configurations and/or additional components:
   the first latch system includes a handle mounted within and pivotal to protrude from the first inner diameter cowl, one or more linking members extending through the first inner diameter cowl and connected to the handle, and one or more latching mechanisms disposed toward a forward end of the first inner diameter cowl and connected to the one or more linking members;
   the first inner diameter cowl includes an aft core cowl and the handle is mounted on the aft core cowl;
   the handle opens in a forward direction relative to the first inner diameter cowl;
   the handle is mounted to a thrust reverser of the first inner diameter cowl;
   the latching mechanism comprise pin latches that engage the engine case; and
   the one or more linking members comprise push-pull cables.

A gas turbine engine includes a case and a nacelle. The nacelle is latched to the case and includes bifurcations, an inner diameter cowl and a first latch system. The inner diameter cowl extends between the upper and lower bifurcations and the first latch system is mounted on the inner diameter cowl. The first latch system is spaced along the inner diameter cowl from the upper and lower bifurcations.

The gas turbine engine of the preceding paragraph can optionally include, additionally and/or alternatively, any one or more of the following features, configurations and/or additional components:
   the left hand nacelle door is latched to the right hand nacelle door.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A nacelle for a gas turbine engine, the nacelle comprising:
   an upper bifurcation;
   a lower bifurcation;
   an inner fixed structure extending between the upper and lower bifurcations, the inner fixed structure comprising first and second halves;
   an outer diameter cowl surrounding the first and second halves;
   a first latch system mounted on the first half of the inner fixed structure and axially disposed along the inner fixed structure between the upper and lower bifurcations, the first latch system having a first handle mounted within and pivotal to protrude from the first half of the inner fixed structure; and
a second latch system mounted on the second half of the inner fixed structure and axially disposed along the inner fixed structure, the second latch system having a second handle mounted within and pivotal to protrude from the second half of the inner fixed structure;
wherein the first latch system further includes:
one or more latching mechanisms disposed toward a forward end of the first half of the inner fixed structure; and
one or more linking members extending axially forward from the first handle, through the outer diameter cowl, and to the one or more latching mechanisms, such that the one or more linking members connect the first handle to the one or more latching mechanisms.

2. The nacelle of claim 1, wherein the first half of the inner fixed structure includes an aft area cowl and the first handle is mounted on the aft area cowl.

3. The nacelle of claim 1, wherein the first handle opens in a forward direction relative to the first half of the inner fixed structure.

4. The nacelle of claim 1, wherein the latching mechanism comprises pin latches that engage a case of the gas turbine engine.

5. The nacelle of claim 1, wherein the one or more linking members comprise push-pull cables.

6. A nacelle for a gas turbine engine, the nacelle comprising:
a first door having a first half of an inner fixed structure disposed within an outer diameter cowl and connected to a first half of a lower bifurcation;
a first latch system mounted on the first half of the inner fixed structure and axially disposed along the first half of the inner fixed structure from the lower bifurcation;
a second door having a second half of the inner fixed structure disposed within the outer diameter cowl and connected to a second half of the lower bifurcation; and
a second latch system mounted on the second half of the inner fixed structure and axially disposed along the second half of the inner fixed structure between the upper and lower bifurcations;
wherein the first latch system comprises:
a first handle mounted within and pivotal to protrude from the first half of the inner fixed structure;
one or more latching mechanisms disposed toward a forward end of the first half of the inner fixed structure; and
one or more linking members extending axially forward from the first handle, through the outer diameter cowl, and to the one or more latching mechanisms, such that the one or more linking members connect the first handle to the one or more latching mechanisms
wherein the second latch system comprises a second handle mounted within and pivotal to protrude from the second half of the inner fixed structure.

7. The nacelle of claim 6, wherein the first inner fixed structure includes an aft area cowl and the first handle is mounted on the aft area cowl.

8. The nacelle of claim 6, wherein the first handle opens in a forward direction relative to the first half of the inner fixed structure.

9. The nacelle of claim 6, wherein the latching mechanism comprises pin latches that engage a case of the gas turbine engine.

10. The nacelle of claim 6, wherein the one or more linking members comprise push-pull cables.

11. A gas turbine engine comprising:
a case; and
a nacelle latched to the case, the nacelle comprising:
an upper bifurcation;
a lower bifurcation;
an inner fixed structure extending between the upper and lower bifurcations, the inner fixed structure comprising first and second halves;
an outer diameter cowl surrounding the first and second halves;
a first latch system mounted on the first half of the inner fixed structure and axially disposed along the inner fixed structure between the upper and lower bifurcations, the first latch system having a first handle mounted within and pivotal to protrude from the first half of the inner fixed structure; and
a second latch system mounted on the second half of the inner fixed structure and axially disposed along the inner fixed structure, the second latch system having a second handle mounted within and pivotal to protrude from the second half of the inner fixed structure
wherein the first latch system further includes:
one or more latching mechanisms disposed toward a forward end of the first half of the inner fixed structure; and
one or more linking members extending axially forward from the first handle, through the outer diameter cowl, and to the one or more latching mechanisms, such that the one or more linking members connect the first handle to the one or more latching mechanisms.

12. The gas turbine engine of claim 11, wherein the upper and lower bifurcations include a first door and a second door, and the first door is latched to the second door.

13. A gas turbine engine comprising:
an engine core;
a case; and
a nacelle latched to the case, the nacelle comprising:
an inner fixed structure disposed within a an outer diameter cowl and having a first half and a second half, the inner fixed structure including a first bifurcation, the first bifurcation including a first door and a second door that encompass at least a portion of the engine core;
a first latch system mounted on the first half of the inner fixed structure, the first latch system having a first handle mounted within and pivotal to protrude from the first half of the inner fixed structure; and
a second latch system mounted on the second half of the inner fixed structure, the second latch system having a second handle mounted within and pivotal to protrude from the second half of the inner fixed structure
wherein the first latch system further includes:
one or more latching mechanisms disposed toward a forward end of the first half of the inner fixed structure; and
one or more linking members extending axially forward from the first handle, through the outer diameter cowl, and to the one or more latching mechanisms, such that the one or more linking members connect the first handle to the one or more latching mechanisms.

14. The gas turbine engine of claim 13 wherein the first door and the second door are latched to the engine core.

15. The gas turbine engine of claim 13 wherein the first latch system includes a structure that latches the first door to the second door.

* * * * *